(12) United States Patent
Martin

(10) Patent No.: US 7,453,408 B2
(45) Date of Patent: Nov. 18, 2008

(54) DETECTION OR IDENTIFICATION ANTENNA INSENSITIVE TO THE ENVIRONMENT THEREOF

(75) Inventor: Jean-Marc Martin, Saint Leu la Foret (FR)

(73) Assignee: Pygmalyon (FR)

(*) Notice: Subject to any disclaimer, the term of this patent is extended or adjusted under 35 U.S.C. 154(b) by 44 days.

(21) Appl. No.: 10/522,202

(22) PCT Filed: Jul. 17, 2003

(86) PCT No.: PCT/FR03/02267

§ 371 (c)(1),
(2), (4) Date: Jan. 27, 2006

(87) PCT Pub. No.: WO2005/010811

PCT Pub. Date: Feb. 3, 2005

(65) Prior Publication Data

US 2006/0139232 A1 Jun. 29, 2006

(30) Foreign Application Priority Data

Jul. 17, 2002 (FR) .................................. 02 09052

(51) Int. Cl.
*H01Q 11/12* (2006.01)
*H01Q 21/00* (2006.01)
*G06K 19/06* (2006.01)

(52) U.S. Cl. ........................ 343/742; 343/867; 235/492

(58) Field of Classification Search ................. 343/742, 343/867, 895; 340/572, 1, 572.1; 235/492
See application file for complete search history.

(56) References Cited

U.S. PATENT DOCUMENTS

| 4,745,401 A | * | 5/1988 | Montean | 340/572.3 |
| 6,161,761 A | | 12/2000 | Ghaem et al. | 235/492 |
| 6,164,551 A | | 12/2000 | Altwasser | 235/492 |
| 6,600,420 B2 | * | 7/2003 | Goff et al. | 340/572.4 |
| 7,066,393 B2 | * | 6/2006 | Stromberg et al. | 235/492 |
| 7,154,449 B2 | * | 12/2006 | Liu et al. | 343/867 |

FOREIGN PATENT DOCUMENTS

| DE | 100 56 148 | 5/2002 |
| FR | 2 803 439 | 7/2001 |
| JP | EP 0 786 357 | 7/1997 |
| US | EP 0 704 816 | 4/1996 |

* cited by examiner

*Primary Examiner*—Shih-Chao Chen
(74) *Attorney, Agent, or Firm*—Cantor Colburn LLP

(57) ABSTRACT

A resonant detection or identification antenna having at least one turn the antenna includes at least one electrically conducting wire and is connected to an electronic transponder chip, the operating frequency of the antenna being greater than or equal to 10 MHz and the area defined by the at least one turn being substantially less than or equal to $0.30 \, m^2$. The total capacitance of the antenna is substantially greater than or equal to 140 pF and the Q-factor of the at least one turn is substantially greater than or equal to 30.

10 Claims, 2 Drawing Sheets

DETECTION OR IDENTIFICATION ANTENNA INSENSITIVE TO THE ENVIRONMENT THEREOF

TECHNICAL FIELD OF THE INVENTION

The present invention relates to a resonant detection or identification antenna of the type comprising at least one turn which comprises at least one electrically conducting wire and is connected to a transponder electronic chip, the operating frequency of the said antenna being greater than or equal to 10 MHz, the area defined by the said at least one turn being substantially less than or equal to 0.30 m².

The antenna forms a resonant circuit operating at high frequency, the value of which is predetermined so as to pick up sufficient energy to supply the electronic chip. The chip is thus said to be a passive chip.

BRIEF SUMMARY OF THE INVENTION

Such antennas are, for example, used in the field of contactless identification and in the field of detection in antitheft systems. These antennas are also commonly called "labels", their area not exceeding 0.30 m² and their operating frequencies being high (above 10 MHz).

The resonant antennas are constructed in such a way that their inductance matches the capacitance of the circuit. This capacitance is in practice close to that of the electronic chip. Now, such circuits are very sensitive to the environment as this behaves as a dielectric medium that particularly affects the capacitance of the circuit.

It is consequently very difficult to produce antennas whose operation is not impaired by a change in medium. In particular, when the resonant antenna is integrated into a player's identification number, and is therefore in contact with a human being, the capacitance of the circuit increases. To solve this drawback, it has been envisaged to modify the shape of the antenna or else to modify the number of turns of the antenna. However, the envisaged solutions do not provide satisfactory results.

BRIEF SUMMARY OF INVENTION

The invention remedies the aforementioned drawbacks by providing a resonant antenna that is virtually insensitive to the environment in which it is placed, and to do so by simple, effective and inexpensive means.

For this purpose, according to the invention, a resonant antenna of the kind in question is essentially characterized in that the total capacitance of the antenna is substantially greater than or equal to 140 pF and in that the Q-factor of the said at least one turn is substantially greater than or equal to 30.

Thanks to these arrangements, an antenna whose operating characteristics are not modified by the environment has been surprisingly obtained.

Advantageously, the transponder chip has a first capacitor of predetermined value and in that a second capacitor is placed in parallel with the electronic chip in such a way that the overall capacitance of the antenna is greater than or equal to 140 pF. It is thus easy to match the capacitance of the antenna according to the capacitance of the chip, which is predetermined during fabrication.

Preferably, the said at least one turn has mechanical properties suitable for the antenna to retain by itself a predetermined shape. The antenna can therefore be used in the form of a bracelet or collar.

In one advantageous embodiment, the said at least one turn is fastened to a support.

Also preferably, the said at least one turn comprises a single-strand wire.

Advantageously, the said at least one turn comprises a wire formed from seven strands and the diameter of which is substantially equal to 0.25 mm, for example.

Preferably, the said at least one turn takes the form of a track deposited on a substrate and the width and the thickness of which are substantially equal to at least 1.4 mm and 35 µm respectively.

Also advantageously, the antenna comprises a single turn.

Preferably, the single turn is chosen from one of the rectangular shapes having recessed corners and rectangular shapes having cut corners.

As a variant, the antenna comprises a first turn and a second turn which is placed inside the first turn and the area of which lies substantially between 10% and 90% of the area of the said first turn.

Preferably, the area of the second turn is substantially equal to half the area of the first turn.

Other features and advantages of the invention will appear over the course of the following description of two of its embodiments given by way of non-limiting example and in conjunction with the appended drawing.

DETAILED DESCRIPTION OF THE INVENTION

Figure 1:
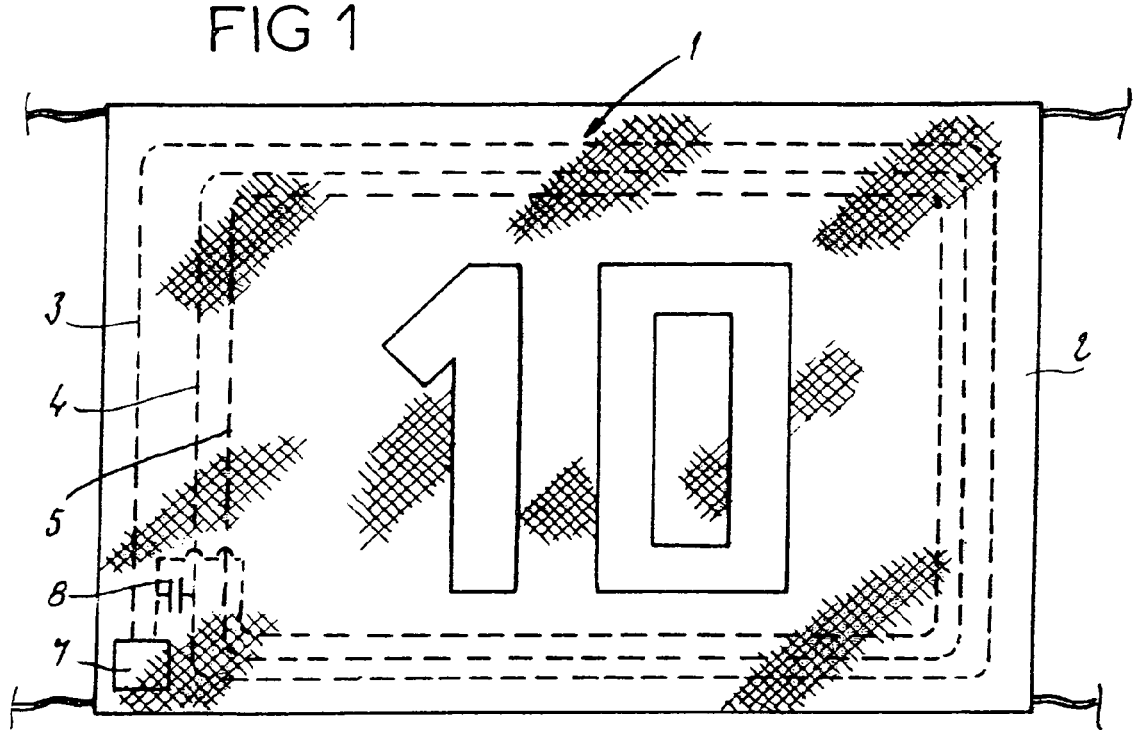
FIG. 1 shows a resonant antenna according to a first embodiment of the invention, associated with a player's identification number.

FIG. 1 shows a preferred but non-exclusive form of a resonant antenna 1 or label according to the invention, associated with a player's identification number 2. The antenna 1 has a small thickness.

The antenna 1 thus comprises, for example, three turns 3, 4 and 5 of rectangular shape. Of course, the shape of the turns may differ, it being possible for the turns to be of square, circular, elliptical or even hexagonal shape. The shape of the turns is chosen according to the application of the antenna.

The resonant antenna 1 constitutes a supply and transmission antenna for a transponder chip 7 which is itself attached to the support or player's number 2.

The electronic chip 7 used is known per se and operates at high frequency, the value of which is greater than or equal to 10 MHz, for example at a frequency of 13.56 MHz. This chip possesses intrinsic characteristics such as its capacitance. The value of this capacitance is determined during fabrication of the chip.

Of course, the antenna according to the invention may be used at other frequencies.

Within the context of the invention, the antenna 1 is said to be of small thickness insofar as the area of the constituent turns is substantially greater than the thickness of this antenna. The area bounded by the turns is small, i.e. less than or equal to 0.30 m². For example, it may be a square with sides of 0.5 m.

In addition, it will be readily understood that this antenna may consist of a single turn 3 connected to the chip 7.

According to another essential feature of the invention, the antenna 1 is constructed so that its overall capacitance is greater than or equal to 140 pF and so that the Q-factor of the coil formed by the turns 3 to 5 (or the turn 3 in the case of a single turn) is greater than or equal to 30.

Insofar as the capacitance of the electronic chip cannot, by construction, reach this 140 pF threshold value, the present invention advantageously provides for a second capacitor 8 to be placed in parallel with the chip 7. The value of this second capacitor is matched to that of the electronic chip 7 so that the total capacitance of the antenna is greater than or equal to 140 pF.

The value of the total capacitance may also be achieved in several other different ways such as, for example, by having several localized capacitors placed at several points in the loop or else localized capacitors associated with distributed capacitors obtained from plates, screens or cable jackets.

The turns 3 to 5 are made, for example, of a copper or aluminum alloy and their geometrical characteristics are designed so as to obtain a Q-factor of greater than or equal to 30.

Thus, a resonant antenna 1 insensitive to its immediate environment is obtained.

Each turn may be a single-strand or multistrand turn. The antenna may thus comprise a wire formed from seven strands, the overall diameter of the wire being about 0.25 mm. The antenna may have a rectangular shape, the length of which is around 190 mm and the width is about 160 mm.

The support 2 to which the antenna is fastened may be made of a material of any type, such as plastic, glass, cardboard, leather, wood, nonwoven fabric or woven fabric.

The turns 3 to 5 may be fastened to the support 2 employing any known technology. The turns may take the form of tracks deposited, for example, by etching or printing, or any other process for depositing a conductive material.

By way of non-limiting example, the track obtained has a width of 1.4 mm and a thickness of 35 µm.

Moreover, it is possible for the label 1 not to be fastened to a support. The turns, or the single turn, are in this case obtained from a material whose mechanical properties allow the turn (or turns) to be supported by itself (or themselves). The antenna may for example take the form of a single turn made from a wire comprising 7 to 19 strands, the diameter of the wire then being close to 0.5 mm.

Figure 2:
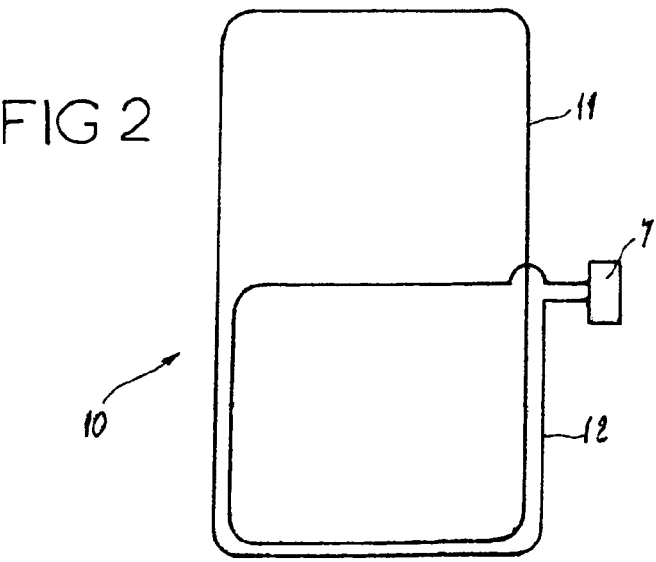
FIG. 2 is a plan view of a resonant antenna according to a second embodiment of the present invention.

Moreover, in a second embodiment, as shown in FIG. 2, the antenna 10 may have any shape matched to the support to which it is intended to be fixed, such as for example a case of approximately rectangular shape.

To achieve the same capacitance, area and Q-factor characteristics as in the first embodiment, while still taking into account the environment in which it is placed, this antenna may, for example, consist of a first turn 11 and a second turn 12, one of which is placed inside the other and has a smaller area.

For example, the second turn 12 is placed inside the first turn 11 and this second turn 12 has an area of between 10% and 90% of the area of the first turn 11. In the present case, the second turn 12 is approximately equal to half the area of the first turn 11.

Thus, the first turn 11 extends along the second turn 12 only over a fraction of its length.

Of course, these turns are also connected to the electronic chip 7 described above.

Figure 3:
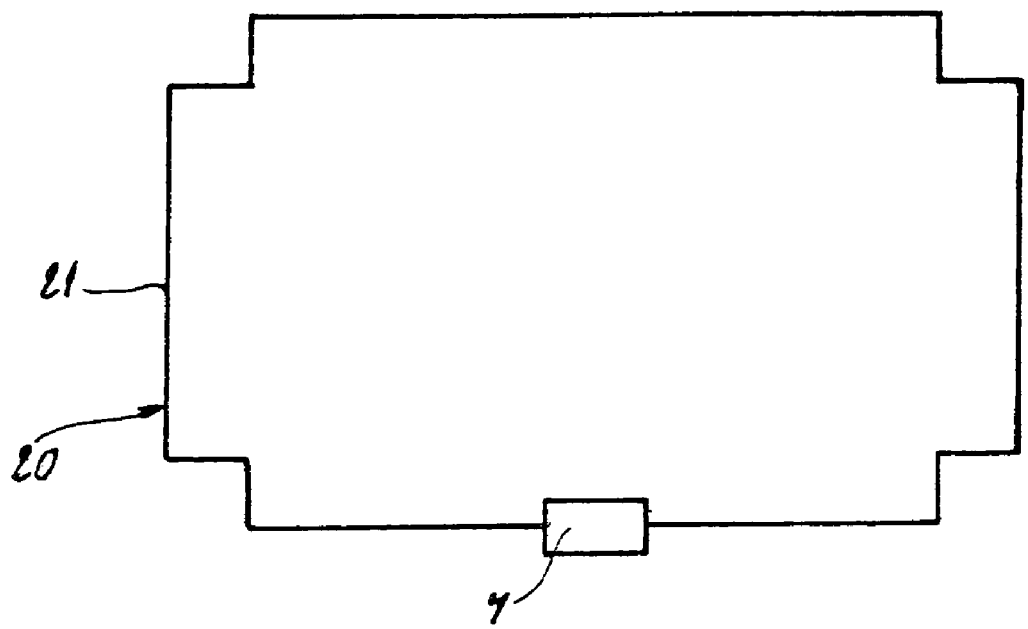
FIGS. 3 and 4 are plan views of an antenna according to third and fourth embodiments of the present invention.
Figure 4:
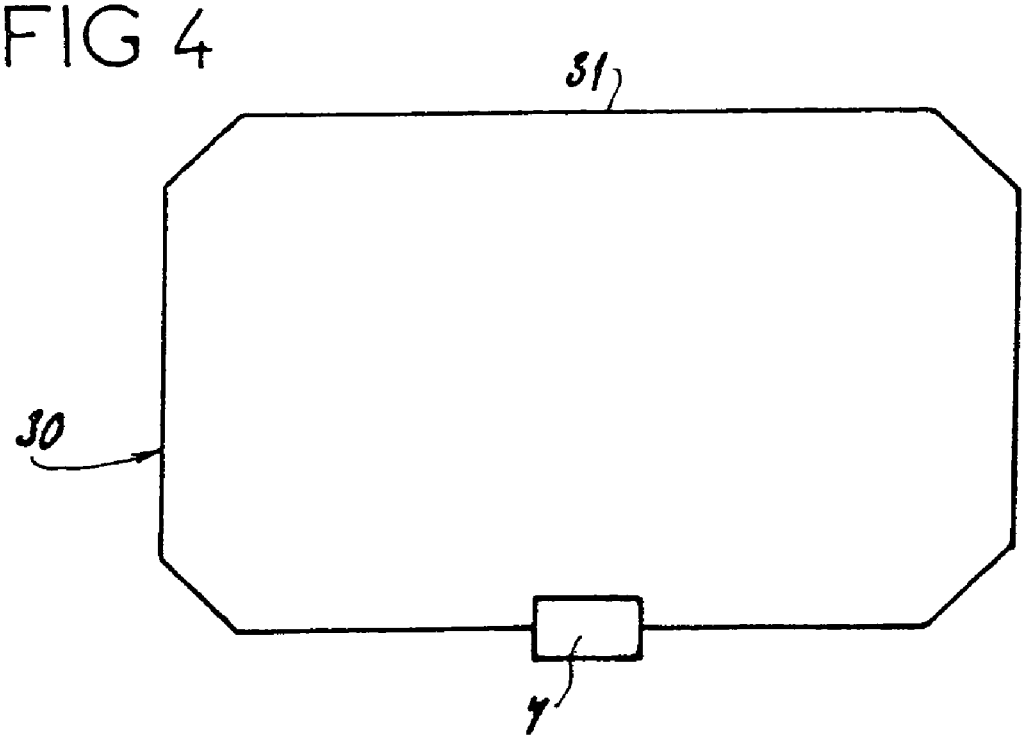

Moreover, as described with regard to the first embodiment, the antenna may comprise a single turn (connected to a chip and optionally to one or more additional capacitors). This turn may be variously shaped, while maintaining the same perimeter, in order for the resonant frequency of the antenna to be perfectly tuned to the desired frequency. For example, as shown in FIG. 3, the antenna 20 comprises a single cross-shaped turn 21 (a rectangular shape whose corners have been recessed). As a variant, the antenna 30 shown in FIG. 4 again comprises a single turn 31 of rectangular shape, the corners of which have been cut off.

Of course, the resonant antenna according to the invention is not limited to the preferred embodiments described above by way of example, but on the contrary it embraces all alternative embodiments falling within the scope of the claims appended hereafter.

The invention claimed is :

1. Resonant detection or identification antenna of the type comprising at least one turn which comprises at least one electrically conducting wire and is connected to a transponder electronic chip, the operating frequency of said antenna being greater than or equal to 10 MHz, an area defined by said at least one turn being substantially less than or equal to $0.30\,m^2$, wherein a total capacitance of the antenna is substantially greater than or equal to 140 pF and a Q-factor of said at least one turn is substantially greater than or equal to 30, wherein the transponder chip has a first capacitor of predetermined value and wherein a second capacitor is placed in parallel with the electronic chip in such a way that the overall capacitance of the antenna is greater than or equal to 140 pF.

2. Resonant antenna according to claim 1, wherein the said at least one turn has mechanical properties suitable for the antenna to retain by itself a predetermined shape.

3. Resonant antenna according to claim 1, wherein said at least one turn is fastened to a support.

4. Resonant antenna according to claim 1, wherein said at least one turn comprises a single-strand wire.

5. Resonant antenna according to claim 1, wherein said at least one turn comprises a wire formed from seven strands and a diameter of which is substantially equal to 0.25 mm.

6. Resonant antenna according to claim 1, wherein said at least one turn takes a form of a track deposited on a substrate and a width and a thickness of which are substantially equal to at least 1.4 mm and 35 µm respectively.

7. Resonant antenna according to claim 1, wherein the antenna comprises a single turn.

8. Resonant antenna according to claim 7, wherein the single turn is chosen from one of rectangular shapes having recessed corners and rectangular shapes having cut corners.

9. Resonant antenna according to claim 1, wherein the antenna comprises a first turn and a second turn which is placed inside the first turn and an area of the second turn lies substantially between 10% and 90% of an area of the first turn.

10. Resonant antenna according to claim 9, wherein the area of the second turn is substantially equal to half the area of the first turn.

* * * * *